United States Patent [19]
Fenwick

[11] Patent Number: 5,412,771
[45] Date of Patent: May 2, 1995

[54] GENERATION OF INTERDEPENDENT FONT CHARACTERS BASED ON LIGATURE AND GLYPH CATEGORIZATIONS

[75] Inventor: Daniel J. Fenwick, Santa Cruz, Calif.

[73] Assignee: Signature Software, Inc., Hood River, Oreg.

[21] Appl. No.: 832,599

[22] Filed: Feb. 7, 1992

[51] Int. Cl.$^6$ ............................................. G06T 5/00
[52] U.S. Cl. ................................... 395/150; 382/266; 395/151
[58] Field of Search ................ 382/13, 14, 15, 9, 54, 382/16; 395/150, 151, 143

[56] References Cited

U.S. PATENT DOCUMENTS

| | | | |
|---|---|---|---|
| 4,244,657 | 1/1981 | Wasylyk | 400/109 |
| 4,718,103 | 1/1988 | Shojma | 382/13 |
| 5,101,439 | 3/1992 | Kiang | 382/9 |
| 5,267,332 | 11/1993 | Walch et al. | 382/55 |
| 5,287,443 | 2/1994 | Mameda et al. | 395/146 |
| 5,295,238 | 3/1994 | Dickson | 395/150 |

OTHER PUBLICATIONS

Apple Computer Inc., "Inside Macintosh, vol. VI", 1991, pp. 14-15 to 14-33, and in particular, pp. 14-29 to 14-32, published by Addison-Wesley.

*Primary Examiner*—Heather R. Herndon
*Assistant Examiner*—J. Feild

[57] ABSTRACT

A method is described for producing a font for creating strings of glyphs representing characters in a language having a handwritten, or other, appearance. The method starts with the step of categorizing each glyph within a set of glyphs to be utilized to create the font according to a set of predefined ligature types. The set of predefined ligature types includes a null ligature type which corresponds to glyphs which are next to a white spaces or next to other glyphs with proper null ligature types. Since each glyph has a left side and a right side, or in some languages, a top and bottom, each of the glyphs is operative to be categorized in as many as two ligature type categories (glyphs could also be categorized in the same ligature type category twice). After the glyphs are categorized, values associated with ligatures of the glyphs categorized within each of the ligature type categories are averaged to produce representative ligature values for each of the ligature type categories. These glyphs are then modified, as necessary, to produce a modified set of glyphs. A modified glyph has ligature values which have been conformed to the representative ligature values from a ligature type category corresponding to the modified glyph. Finally, the various glyphs from the modified set of glyphs are assigned to the strings of glyphs to represent characters as required by the font so as to produce strings of glyphs having a handwritten appearance.

18 Claims, 7 Drawing Sheets

| leading ligature catagories | c | e | g | l | o | p | r | t | y |
|---|---|---|---|---|---|---|---|---|---|
| (ø) null type | c | e | q | | | | | | |
| (l) lower | c | e | | | o | | r | | y |
| (u) upper | c | | | | | p | | | |
| (d) diagonal | c | | | l | | p | r | t | y |

GENERATION OF INTERDEPENDENT FONT CHARACTERS BASED ON LIGATURE AND GLYPH CATEGORIZATIONS

FIELD OF THE INVENTION

The present invention relates generally to a type of font for use with computer displays and printers, and more particularly, to a font, and its development, which allows a user to enter characters into a computer system and have them displayed as though the characters were written by hand.

BRIEF DESCRIPTION OF THE PRIOR ART

A script is a writing system for a human language. A font is a complete set of characters for a script of one type size and one type face. A font generally includes upper and lower case characters, numerals, punctuation marks, etc. A glyph is the displayed form that represents a character within a font of a script. Each person who learns how to write invariably creates their own font over time because no two styles of writing could possibly be the same. No matter how careful a person is, however, such fonts are impossible to repeat and invariably change over time. Typewriter and printing press fonts or computer generated fonts are popular because they typically don't change over time and writers can readily switch between different types of fonts. These prepared fonts are typically created by a font manufacturer and licensed or sold to a large number of different companies who use them in typewriters, printers and computers.

One problem with prepared fonts is that they always look the same, regardless of who uses them, unlike handwritten fonts. The unique and distinguishable characteristics of handwritten fonts make them very popular and allow people to personalize printed communications. Many attempts have therefore been made to create fonts which appear more like handwriting than do standard prepared fonts. With respect to the use of fonts in computer systems, one such attempt has been to use Kerning prior to outputting characters to a printer or display. Kerning is a method in which the spacing between adjacent characters is conditioned upon the identities of these adjacent characters. This technique at least produces interdependent character strings that look more esthetically pleasing than those techniques using constant spacing.

Another solution has been to use handwritten looking glyphs in fonts. However, since this solution only produces individual characters which look handwritten and not whole words, attempts have also been made to link characters together in a manner similar to that when characters are cursively written by hand. One technique is to design each character such that any next character's left side blends exactly into the right side of any previous character. This is most typically achieved by having the leading ligature for each character start at the same level as the trailing ligature for that character, such that when individual characters are placed closely to one another, leading and trailing ligatures overlap, thereby giving the appearance of being connected. Unfortunately, this technique only produces artificial looking connected characters which maintain the same appearance despite different users and different contexts in which the characters are used.

Some script systems for computers, like the Script Manager for System Software 7.0, manufactured by Apple Computer, Inc., Cupertino, Calif., and briefly described in "Inside Macintosh, Volume VI", Addison-Wesley, 1991, recognize that some scripts are context dependent. Context dependence means that character forms, or glyphs, may need to be modified by the values of preceding and following characters, such as in cursive English, where a "t" used at the beginning of a word may appear very different than a "t" used in the middle or at the end of a word, or as in Arabic, where the displayed form of many characters changes depending on other nearby characters.

Inside Macintosh does not describe in any detail how the Script Manager handles context analysis. It is likely, however, that the Script Manager simply relies on a large set of character rules, based on information regarding the type of characters adjacent to the character in question, which enable the Script Manager to determine which characters to use. For example, when an "a" is used at the beginning of a word, use "#1: 'a'", but when an "a" is used after a "b," and no character follows, use "#2: 'a'", etc. Such a system would probably result in the proper type of character being used in each contextual situation, but would probably only achieve smooth looking ligatures if it also included a very large database of different characters for each possible character combination.

SUMMARY OF THE INVENTION

A method for producing a font for creating strings of glyphs representing characters in a language having a handwritten, or other, appearance. The method starts with the step of categorizing each glyph within a set of glyphs to be utilized to create the font according to a set of predefined ligature types. The set of predefined ligature types includes a null ligature type which corresponds to glyphs which are next to a white space or next to other glyphs with proper null ligature types. Since each glyph has a left side and a right side, or in some languages, a top and bottom, each of the glyphs is operative to be categorized into as many as two ligature type categories (glyphs could also be categorized in the same ligature type category twice). After the glyphs are categorized, values associated with ligatures of the glyphs categorized within each of the ligature type categories are averaged to produce representative ligature values for each of the ligature type categories. These glyphs are then modified, as necessary, to produce a modified set of glyphs. A modified glyph has ligature values which have been conformed to the representative ligature values from a ligature type category corresponding to the modified glyph. Finally, the various glyphs from the modified set of glyphs are assigned to the strings of glyphs to represent characters as required by the font so as to produce strings of glyphs having a handwritten, or other, appearance.

DETAILED DESCRIPTION OF THE PREFERRED EMBODIMENTS

Figures 1A, 1B:
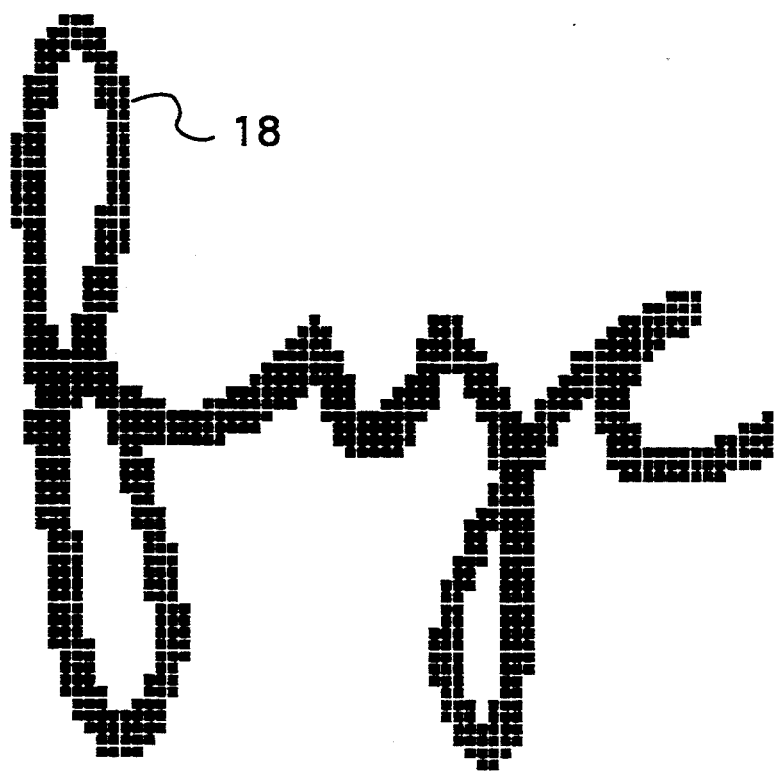
FIGS. 1a through 1d illustrate how a writing sample is processed to produce glyphs for use in accordance with the preferred embodiment of the present invention.

Although the present invention has application to the production of a font having any desired appearance, it is particularly well suited, in accordance with the preferred embodiment of the present invention, to the production of a font capable of producing character strings which "look" like they have been handwritten. To produce such a font, however, each character must be formed in a manner similar to that used by a person. For example, when someone writes an "a" at the beginning of a word, they often write that "a" much different than they would write the same "a" in the middle or at the end of a word. Such variations are partially due to the eccentricities of each writer, but can also be due to changes which must be made to each character to make it connect gracefully to another character. Humans, with their many real-time processing capabilities, know to simply use a different glyph when necessary and to change the connections between the various characters (known as ligatures) when the contextual usage of a character so requires. This same process is not so easy for computers, especially personal computers with limited processing and storage capabilities, because it requires the storage and use of a great many different ligature and glyph types. This is particularly true with respect to the English language, which has as many as 676 (or $26^2$) different ligature types.

In accordance with the present invention, it has been found, however, that since many of these ligatures have similar characteristics, they can be categorized into small numbers of distinct ligature types, such as high ligature types, low ligature types, etc. It has also been found that many glyph variations correspond in degree with variations in ligature types. The present invention optimizes these two findings by utilizing at least two glyphs, each with different leading ligature types, for each of the characters of any particular font, and selecting the proper glyph choice for a character based on the identity of the previous glyph choice(s) of adjacent characters. This same technique also allows for substitutions of whole character combinations and other modifications based on unique characteristics of a language. For example, in the case of the double "t", whenever the letter "t" immediately follows another letter "t", both letters are replaced by a single "tt" glyph. In addition, there could be multiple "tt" glyphs to accommodate the different glyph types that might be required. The number of different glyph choices for a single character (or multiple characters) is only limited by the font's manufacturer.

Although a font manufacturer could simply use the present invention to produce a font featuring the cursive handwriting of a skilled writer, such a font would probably not be as popular as a font which was created for a particular individual utilizing that person's own handwriting. To produce a font from an individual's writing, it is first necessary to have that person produce a writing sample, such as the writing sample 10 of FIG. 1a, which is partially comprised of the words "cyclops" 12, "ectype" 14 and "grocery" 16. Writing sample 10, the complete contents of which is not critical to an understanding of the present invention, should include as many words or character strings as necessary to produce every glyph type needed to produce a font in accordance with the present invention, but not be so long as to be onerous to produce. It would also be possible to create such a font by simply analyzing a sufficient quantity of an individual's handwriting.

A writing sample can be input to a computer by either digitally scanning writing from a paper or entering the writing sample directly from a writing tablet or stylus-sensitive display in either a bitmap or cubic spline format. FIGS. 1 through 3 provide a short explanation of how a bitmapped writing sample would be processed by a computer in order to produce the base glyphs of a font and how to categorize glyphs and ligatures. FIGS. 4 through 7 provide a detailed explanation of how such writing samples are processed and how the resulting font is utilized by the computer.

Figure 1C:
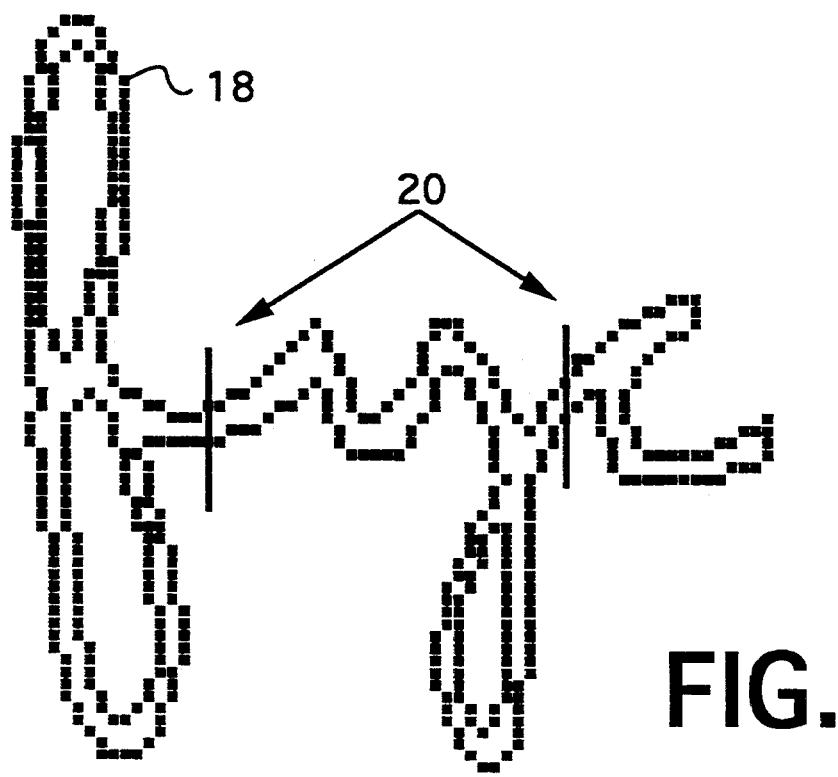
Figure 1D:
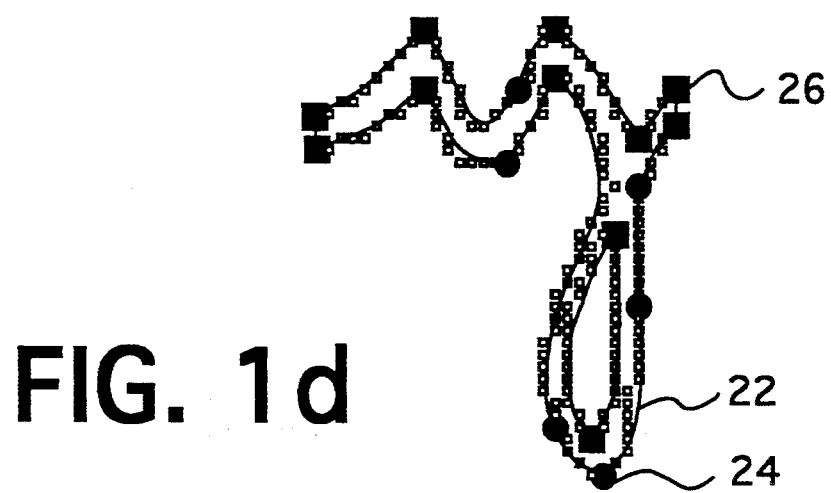
Figures 2, 3:
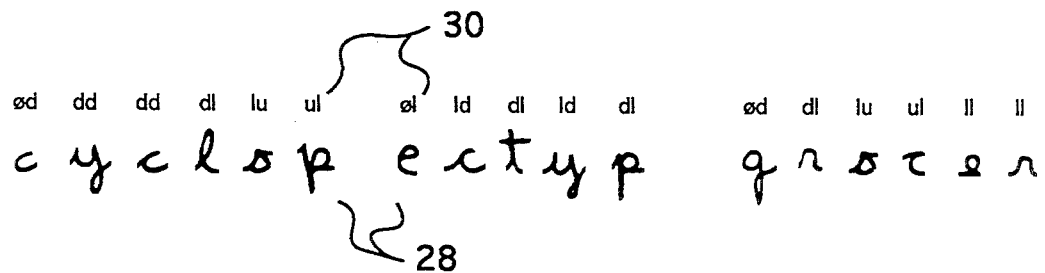
FIG. 2 illustrates how the individual glyphs produced in FIG. 1 are assigned ligature types in accordance with the preferred embodiment of the present invention.
FIG. 3 illustrates how the glyphs of FIG. 2 are categorized according to ligature types.

In FIG. 1b, a bitmapped sample 18 is taken from part of writing sample 10. In FIG. 1c, the bitmapped sample of FIG. 1b is chaincoded to remove the interior bits and the ligature cut points 20 are determined so the characters can be disconnected. In FIG. 1d, a disconnected character 22 from FIG. 1c is converted to Bezier curves, having characteristic ● NODE POINT 24 and ■ CORNER POINT 26 designations.

Although the examples given herein are in English, it should be noted that the present invention would work equally well when applied to other languages, such as Japanese, where characters are also written and connected together in the particular style of the individual writer. Even though different individuals may write the same characters in substantially the same manner is some languages (i.e., in the Kanji script of the Japanese language, characters are typically written in the same manner by every individual), any differences that do exist are still considered to be of great importance to their individual creators. The present invention would aid to maintain the eccentricities in any written language.

After the glyphs have been chaincoded, disconnected and converted, leading and trailing ligature types, defined by corresponding ligature type categories further illustrated in FIG. 3, are assigned to each glyph as appropriate. As defined herein, a leading ligature is any ligature which starts a character and a trailing ligature is any ligature which ends a character, regardless of whether that character is written left-to-right, right-to-left, top-to-bottom, or bottom-to-top. These leading and trailing ligature types are determined in advance and are based upon the appearance and characteristics of the written language of the individual providing the writing sample. The greater the number of ligature type categories defined, the smoother the alignment between glyphs, which is preferably as seamless as possible. Hence, if it was desirable to produce a font which would generate strings of glyphs which looked exactly like a person's writing, it might be necessary to select tens to hundreds of different ligature type categories. Nevertheless, perfectly acceptable looking glyph strings can be generated with a smaller number of defined categories.

With respect to the complete writing sample 10, partially shown in FIG. 1a, which is in English, only four categories of ligature types, (0) null, (l) lower, (u) upper, and (d) diagonal, corresponding to both the leading and trailing ligatures, have been defined. Each glyph would therefore be assigned two ligature types, leading and trailing, such as "Ol" or "du." For example, with respect to FIG. 2, the individual glyphs 28 from the writing sample 10 are assigned the ligature types 30. Although ligature types could be assigned according to predefined rules relating to the distance of the vertical position of the ligatures to a base line and the slope of the ligatures, more often than not, the assignment of ligature types will depend on a subjective determination of a person analyzing a writing sample.

A (0) null ligature type can correspond to ligatures of glyphs which have been printed instead of cursively written, or which are at the beginning of words or follow blank spaces. A (l) lower ligature type corresponds to ligatures which have a vertical position and a slope that causes the ligatures to appear to be positioned within a first area. As previously stated, a ligature could be categorized within this first area if the vertical position of the ligature was above some predefined distance from a baseline. A ligature could also be categorized within this first area if the vertical position of the ligature was below that predefined distance from the baseline, but the slope of the ligature was such that the ligature appears like it should be categorized as a lower ligature type. An (u) upper ligature type corresponds to ligatures which appear to be within a second area, and a (d) diagonal ligature type corresponds to ligatures which appear to be between the first and second areas. In FIG. 3, it is illustrated that after leading and trailing ligature types are assigned to each glyph, the glyphs are put into leading ligature type categories and the glyphs and their ligature endpoints are adjusted so that differences between the ligature endpoints of the glyphs in the same categories can be forced to mathematically correspond exactly, as is further explained below.

With reference now to FIGS. 4 through 7, a more detailed description of the preferred embodiment of the present invention will be illustrated. This presently preferred embodiment is represented by flow charts illustrating significant steps of a computer program for performing the methods embodied in the present invention. This program is presently intended to be run by an Apple Macintosh computer manufactured by Apple Computer, Inc., utilizing character description languages, such as Postscript by Adobe Systems Corp., or Truetype by Apple Computer, Inc., to produce accurate display or printer outputs. The program could also be readily modified to run on virtually any type of computer system using other character description languages.

Figure 4:
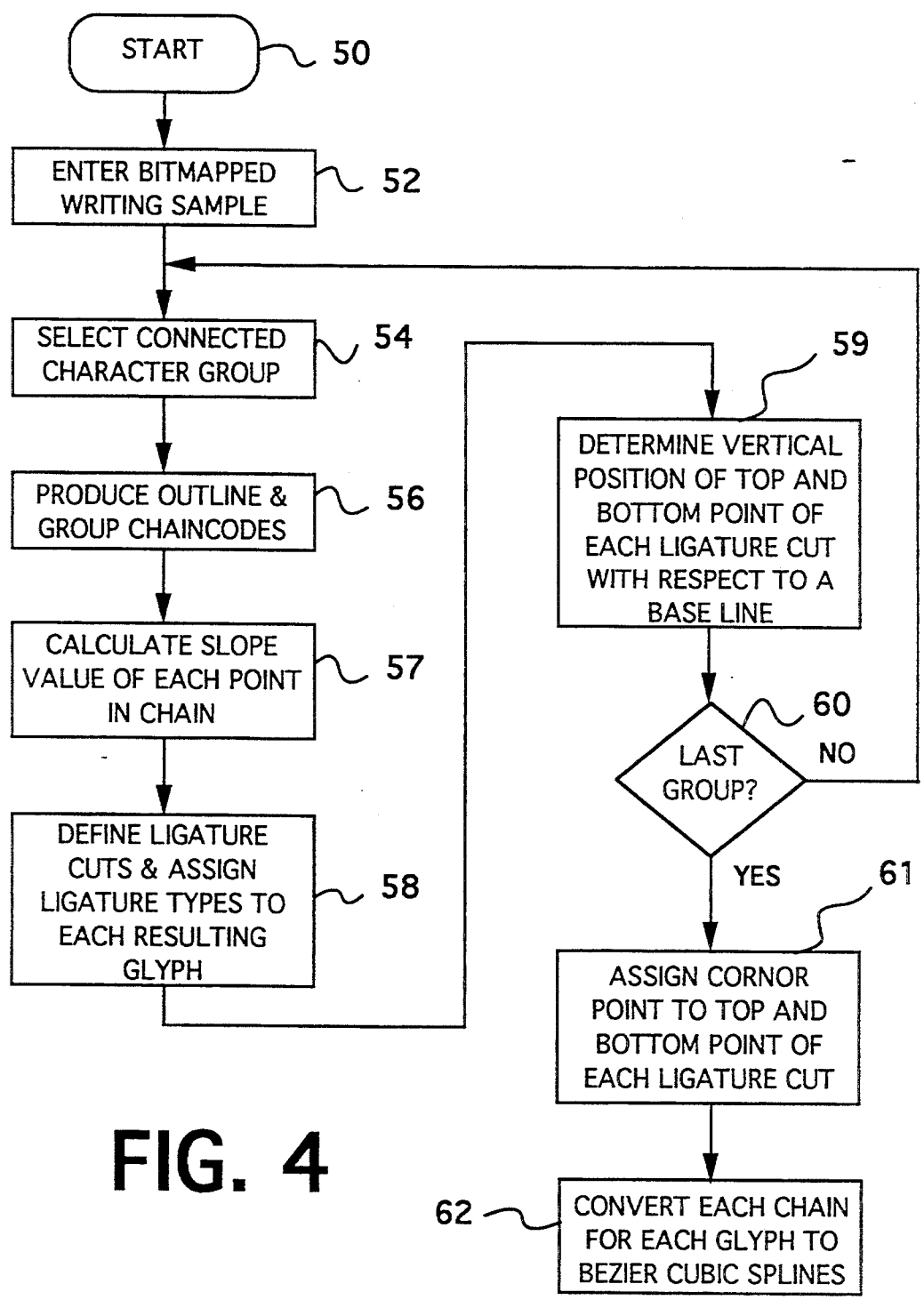
FIG. 4 is a flow chart diagram illustrating, in greater detail, how the bitmapped samples of connected glyphs from FIG. 1 are processed by chaincoding, disconnection and conversion to Bezier curves and how slope values and vertical position values are calculated.

As illustrated in FIG. 4, the program is started, block 50, as data is entered in an appropriate format, such as a bitmapped writing sample, block 52, like that illustrated in FIG. 1b. A group or string of connected characters is then selected, block 54, such as one of the words 12–16 of FIG. 1a, and an outline and chaincodes of the group of characters are produced, block 56, such as illustrated in FIG. 1c. The tangent of each point in the chain is then calculated resulting in a slope value for each of the points in the chain, block 57. To separate each character in the group, ligature cuts are then defined and the resulting glyphs are assigned ligature types as previously described, block 58, primarily based on their appearance.

Once the ligature cuts are made and the various ligatures of each glyph are defined, it becomes clear that each ligature has its own unique appearance and characteristic. This characteristic is in part based on the vertical position of the points making up the ligature, as well as the slope of the ligature's line curve at its various points. Rather than calculate the vertical position of all of the points comprising the ligature, however, only the vertical position of the top and bottom points at the ends of each ligature are determined, which is done with respect to a predetermined base line, block 59. As defined herein, these top and bottom points, which as further described below, form subcategories of the ligature category types, could also be adjacent points, left and right points, etc., depending on the particular application of the present invention. A check is then performed, block 60, for additional groups, and if additional groups remain to be processed, the steps of blocks 54 to 59 are repeated. If there are no more groups to be processed, a Bezier corner point is automatically assigned to each top and bottom point of each ligature cut, block 61, and then each chaincode for each glyph is converted to Bezier cubic splines, block 62. Naturally, if the glyphs are initially entered as cubic splines, the processing described in FIG. 4, except for the assignment of ligature types to the ligatures and the assignment of corner points to the top and bottom cut points, would not be necessary.

Figure 5:
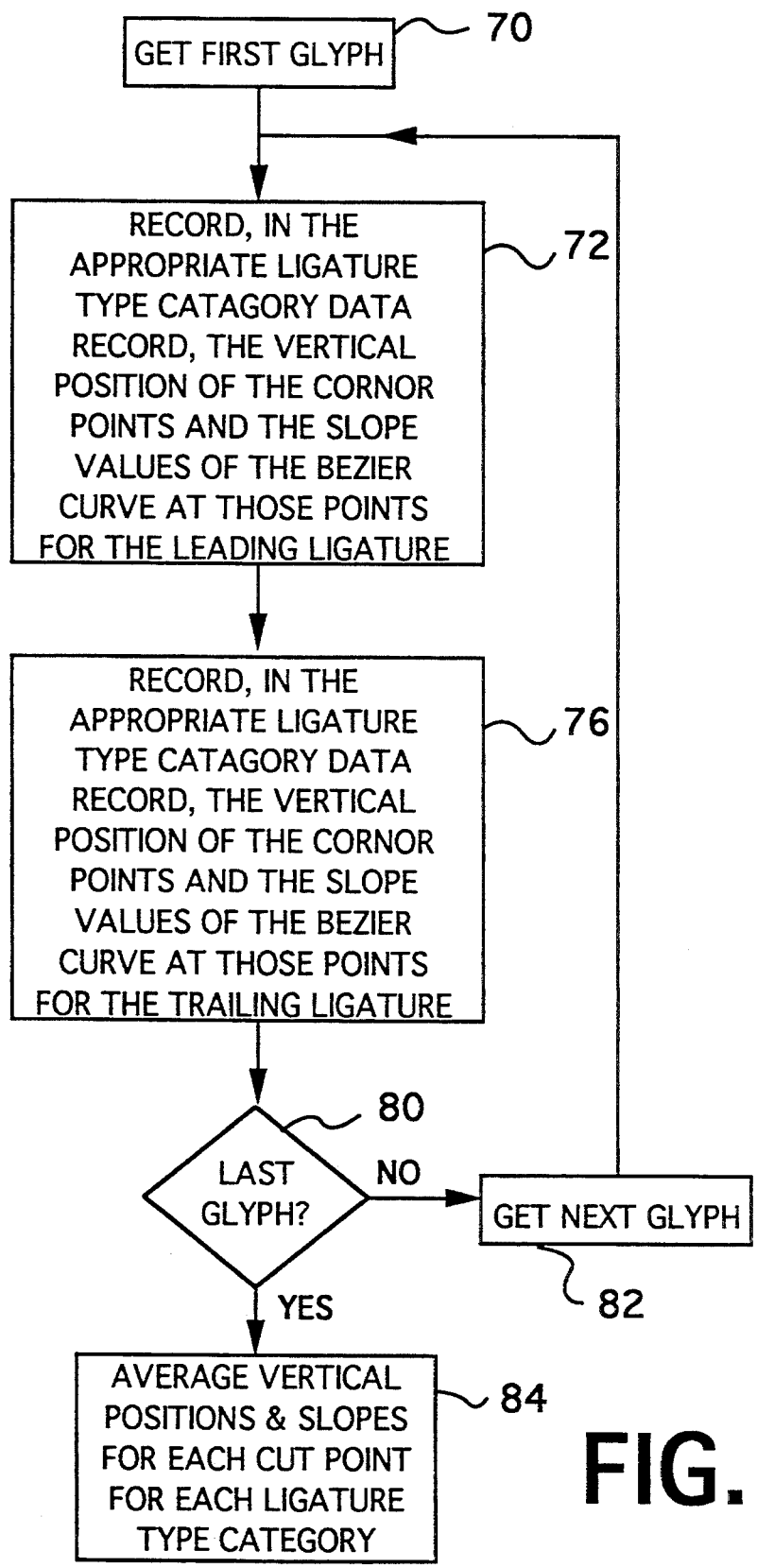
FIG. 5 is a flow chart diagram illustrating the manner in which ligature vertical position values and slope values are extracted from the glyphs sampled in FIG. 1, and then recorded and averaged.

As illustrated in FIG. 5, the first glyph from the first group of glyphs entered in FIG. 4 would then be retrieved, block 70, from the memory of the computer where the glyphs had been temporarily stored after being processed in FIG. 4. So as to facilitate the averaging of vertical position values and slope values for each ligature type, the vertical position values of the corner points and the slope values of the Bezier curve at those corner points for the leading ligature of the current glyph would be recorded in an appropriate ligature type category data record, block 72. In accordance with the preferred embodiment described herein, there would be a total of four ligature type category data record ((0), (l), (u), and (d)), and each of these data records would contain the vertical position values for both corner points (the top and bottom points of the ligature (cut) point only, not other corner points which might also be included in the ligature) and the slope values for both corner points. The same process would then be carried out for the trailing ligature of the current glyph, block 76, whereby the vertical position values of the corner points and the slope values of the Bezier curve at those corner points for that trailing ligature would be recorded in the same appropriate ligature type category data record used in block 72. A check would then be performed to locate more glyphs to process from the stored groups of glyphs, block 80. If glyphs remained to be processed, the next glyph would be retrieved from memory, block 82, and the steps of blocks 72 and 76 would be repeated for that glyph. Having repeated this process for each glyph in the stored groups of glyphs, and in order to normalize differences between ligature types within the same ligature type categories, the vertical position values and slope values within each ligature type category for top corner (cut) points and bottom corner (cut) points would be separately averaged, block 84, so as to produce a representative ligature for each ligature type category.

It should be noted at this point, however, that the last glyph looked for in block 80 is not actually the last glyph in the selected group, but the second to last glyph in that group. The reason for not using the actual last glyph in a group relates to block 84, in which the average vertical positions and slopes within each ligature type category are determined. Many writers, at least in the English language, write the last character of each word with greater flair than commonly practiced when writing other characters. Hence, if the vertical position and slope of ligatures for such glyphs were utilized when calculating average vertical positions and slopes, those averages would be adversely affected. Nonetheless, a font manufacturer could include the actual last glyphs in each group if so desired. In this instance, an additional 3×26 (or 78) more distinct glyphs would be included in the font, thereby allowing for upper, lower, and diagonal ligature types for the trailing ligature of the last character of a word.

Figure 6:
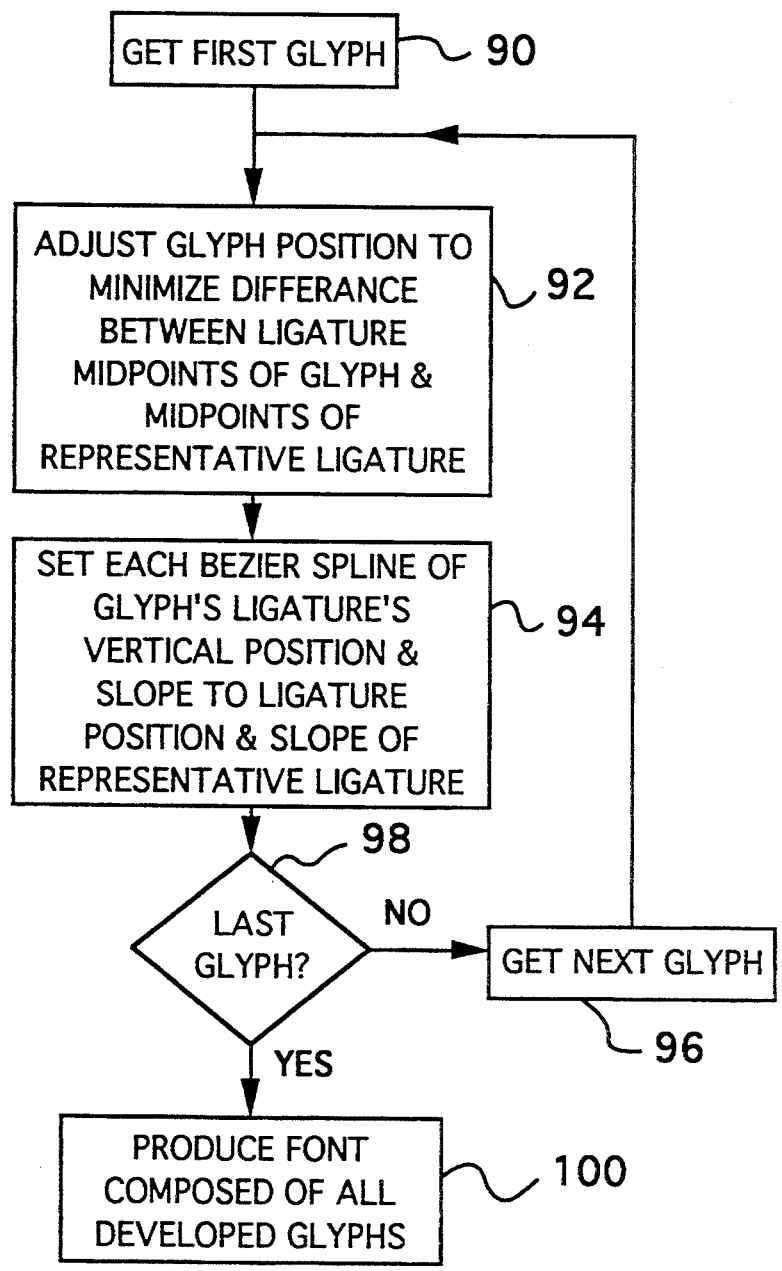
FIG. 6 is a flow chart diagram illustrating the manner in which the averaged results for positions and slopes in FIG. 5 are applied to each of the glyphs.
Figure 7:
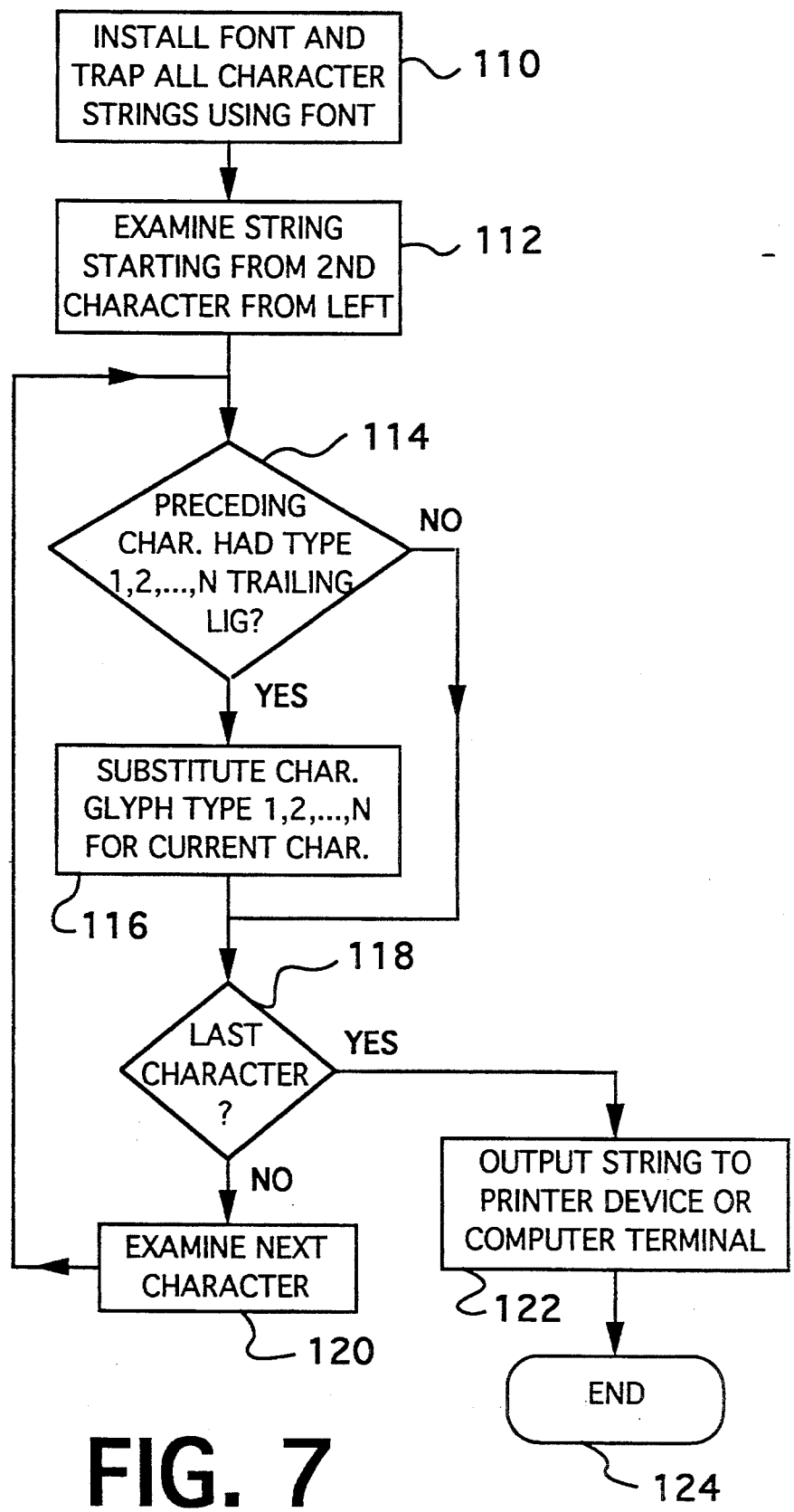
FIG. 7 is a flow chart diagram illustrating the manner in which fonts composed of the interdependent glyphs derived in FIG. 1 are utilized.

With reference now to FIG. 6, glyphs used in FIG. 5 would again be retrieved from memory, block 90. The vertical position of each of these glyphs would then be adjusted as necessary, block 92, in order to minimize the position difference between the vertical midpoints of the top and bottom corner (cut) points of the leading and trailing ligatures for that glyph and the vertical midpoints of the top and bottom corner points corresponding to representative ligatures of the same ligature type categories. As a further adjustment, the slopes and vertical positions of the top and bottom corner points for the leading and trailing ligatures of each glyph would then be set to the averaged slopes and vertical positions of the top and bottom corner points of the representative ligatures for the same ligature type categories, block 94. These last two steps further normalize the appearance of each glyph so the same glyphs can be used in a variety of different character combinations. The steps of blocks 92 and 94 are repeated for each glyph, block 96, in a selected group until the last glyph available for such purposes (the second to last glyph in a group) has been processed, block 98. Once all of the glyphs from the groups have been processed, a font composed of all of the developed glyphs would be produced, block 100.

Having explained how a font would be produced from a writing sample in accordance with the preferred embodiment of the present invention, the preferred manner in which such a font is utilized in the computer system will now be described. The font is first installed in the system software program of the computer system and utilized to trap all character strings as they are entered into the computer system, block 110. Each string is then examined, block 112, starting from the second character from the left, to determine the ligature types of the characters in the character string. The examination does not start with the first character in the string because the first character in the character string is by default an appropriate initial glyph in either upper or lower case. An initial glyph can be any glyph which has a (0) null leading ligature.

Having identified the current character from which to work, the ligature type of the trailing ligature of the preceding character is then identified, block 114, as either a type 1,2, . . . , N trailing ligature, to determine which ligature type to utilize for the leading ligature of the current character. If the ligature type of the trailing ligature of the preceding character was identified as a type 1 trailing ligature, then the current character would be substituted for a character glyph having a type 1 leading ligature, block 116, provided that type 1 trailing ligatures match type 1 leading ligatures, etc. If the ligature type of the trailing ligature of the preceding character is a (0) null type, no substitution would be made. There is only one leading glyph per character per leading ligature type, e.g., the set of leading ligatures for the letter "a" only includes one glyph with a null leading ligature, one glyph with a lower leading ligature, etc. By checking the current character each time to see if it is the last character, block 118, and if it is not, examining the next character, block 120, all characters in the character string are eventually processed. When the last character is processed, the substituted string is output to a printer device or a computer terminal, block 122, and the process is ended, block 124.

Although the present invention has been described with reference to FIGS. 1 through 7 and with emphasis on a particularly preferred embodiment, it should be understood that the figures are for illustration only and should not be taken as strict limitations of the invention. It is contemplated that many changes and modifications may be made by one of ordinary skill in the art to the elements, processes and arrangement of elements of the invention without departing from the spirit and scope of the invention as disclosed above.

For example, the ligatures might be used, not to indicate how the glyphs are connected, but to indicate the way a glyph is written contextually, e.g., a certain "a" glyph would be used when following the characters "g", "j", and "y", and another type of "a" would be used when following an "a", "c", or "e", etc. This technique has the ability to create writing which more closely reflects the actual writing of the individual who produced the writing samples with disconnected characters. Also, by using random selections of which glyphs are used within any given character string (e.g. which "a" glyph to use for the "a" character, etc.), a further increase in the natural feel of the output would be achieved. Hence, glyphs need not be connected to benefit from these contextual treatments.

I claim:

1. A computer implemented method, using a prototype set of glyph image data, for producing a contextual font for creating strings of glyphs representing characters in a language having a desired appearance, comprising the steps of:

from a prototype set of glyph image data, said glyph image data comprising a set of glyphs, categorizing each glyph within said set of glyphs to be utilized to create said font according to a set of predefined ligature types, each of said glyphs having either zero ligatures, one ligature, or two ligatures, each of said ligatures having an appearance value, such that each of said glyphs is categorized into at least two ligature type categories;

averaging appearance values associated with ligatures of said glyphs categorized within each of said ligature type categories to produce a representative ligature defined by representative appearance values for each of said ligature type categories; and modifying said set of glyphs to produce a modified set of glyphs representing said font, each of said glyphs being modified as necessary to conform said appearance values for each of said glyphs to said representative appearance values from a ligature type category corresponding to each of said glyphs, whereby strings of glyphs produced from said modified set of glyphs have said desired appearance.

2. A method for producing a font, as recited in claim 1, wherein said step of categorizing includes the step of calculating said appearance values for each of said ligatures of said glyphs and categorizing each of said glyphs within one of said ligature type categories according to said appearance values, said appearance values including at least one slope value and at least one position value for at least one predefined characteristic of one of said ligatures, and wherein said averaging includes the steps of:

averaging all of said slope values corresponding to each said predefined characteristic within each said ligature type category to produce an average slope value for each said predefined characteristic within each said ligature type category;

averaging all of said position values corresponding to each said predefined characteristic within each said ligature type category to produce an average position value for each said predefined characteristic within each said ligature type category; and combining each said average slope value and each said average position value for each said ligature type category to form each said representative appearance value for each said ligature type category.

3. A method for producing a font, as recited in claim 2, wherein said step of modifying includes the step of adjusting a glyph's position to cause each said ligature of said glyph to more closely align with each said representative ligature corresponding to said glyph.

4. A method for producing a font, as recited in claim 3, wherein said step of modifying further includes the steps of:

for each glyph having a slope value of a predefined characteristic of a ligature of a glyph which does not conform to an average slope value corresponding to said predefined characteristic of said ligature of said glyph, setting said slope value to said average slope value; and for each glyph having a position value of a predefined characteristic of a ligature of a glyph which does not conform to an average position value corresponding to said predefined characteristic of said ligature of said glyph, setting said position value to said average position value.

5. A method for producing a font, as recited in claim 1, wherein said ligatures include leading ligatures and trailing ligatures, and further comprising the steps of:

assigning an initial glyph from said modified set of glyphs to represent a character portrayed at the beginning of a string of glyphs;

assigning a double null glyph from said modified set of glyphs to represent a character unconnected to other characters; and assigning other glyphs from said modified set of glyphs to represent characters connected to one or more other characters portrayed by said string of glyphs in such a manner that said leading ligatures and said trailing ligatures of adjacent glyphs connect to form a continuous line between a trailing ligature and an adjacent leading ligature, wherein said line has a continuous slope at the point of connection between said trailing ligature and adjacent leading ligature.

6. A method for producing a font, as recited in claim 5, wherein said step of categorizing includes the step of calculating said appearance values for each of said ligatures of said glyphs and categorizing each of said glyphs within one of said ligature type categories according to said appearance values, said appearance values including at least one slope value and at least one position value for at least one predefined characteristic of one of said ligatures, and wherein said averaging includes the steps of:

averaging all of said slope values corresponding to each said predefined characteristic within each said ligature type category to produce an average slope value for each said predefined characteristic within each said ligature type category;

averaging all of said position values corresponding to each said predefined characteristic within each said ligature type category to produce an average position value for each said predefined characteristic within each said ligature type category; and combining each said average slope value and each said average position value for each said ligature type category to form each said representative appearance value for each said ligature type category.

7. A method for producing a font, as recited in claim 1, wherein said appearance values include at least one slope value and at least one position value for at least one predefined characteristic of one of said ligatures, and wherein said set of predefined ligature types further includes:

a first ligature type corresponding to glyphs having ligatures which have an appearance value corresponding to a first predefined area with respect to said glyphs;

a second ligature type corresponding to glyphs having ligatures which have an appearance value corresponding to a second predefined area with respect to said glyph; and a third ligature type corresponding to glyphs having ligatures which have an appearance value corresponding to a third predefined area with respect to said glyph, said third predefined area being between said first predefined area and said second predefined area.

8. A method for producing a font, as recited in claim 7, wherein said step of categorizing includes the step of calculating said appearance values for each of said ligatures of said glyphs and categorizing each of said glyphs within one of said ligature type categories according to said appearance values, said appearance values including at least one slope value and at least one position value for at least one predefined characteristic of one of said ligatures, and wherein said averaging includes the steps of:

averaging all of said slope values corresponding to each said predefined characteristic within each said ligature type category to produce an average slope value for each said predefined characteristic within each said ligature type category;

averaging all of said position values corresponding to each said predefined characteristic within each said ligature type category to produce an average position value for each said predefined characteristic within each said ligature type category; and combining each said average slope value and each said average position value for each said ligature type category to form each said representative appearance value for each said ligature type category.

9. A computer implemented method for producing a string of characters having a desired appearance from a set of glyph image data, said glyph image data comprising a set of glyphs, said set of glyphs corresponding to characters within the string of characters, each of the characters corresponding to at least one glyph, each of the glyphs that attach to an adjacent glyph wherein at least two adjacent glyphs are connected having at least one ligature for connecting to each connecting adjacent glyph, comprising the steps of:

categorizing each of said glyphs according to a set of predefined ligature types, each of said glyphs being categorized within at least one ligature type category, each ligature type category including one or more subcategories defined by one or more appearance values associated with each ligature;

averaging said appearance values for each subcategory of said ligature type categories to produce a representative ligature for each ligature type category, each representative ligature being comprised of averaged appearance values from said subcategories within a corresponding ligature type category;

modifying said set of glyphs as necessary to minimize differences between said appearance values for each of said glyphs and said averaged appearance values of representative ligatures corresponding to said glyphs; and selecting said glyphs from said set of glyphs to represent said characters in said string of characters in order to produce said desired appearance.

10. A method for producing a string of characters, as recited in claim 9, wherein said step of categorizing includes the step of calculating said appearance values for each of said ligatures of said glyphs and categorizing each of said glyphs within one of said ligature type categories according to said appearance values, said appearance values of said subcategories including a slope value and a position value, and wherein said averaging includes the steps of:

averaging said slope values within each of said subcategories to produce an averaged slope value for each subcategory;

averaging said position values within each of said subcategories to produce an averaged position value for each subcategory; and combining said averaged slope value and said averaged position value for each subcategory within a ligature type category to form said averaged appearance values for each ligature type category.

11. A method for producing a string of characters, as recited in claim 10, wherein said step of modifying includes the step of adjusting a glyph's position to cause each said ligature of said glyph to more closely align with said representative ligature corresponding to said glyph.

12. A method for producing a string of characters, as recited in claim 11, wherein said step of modifying further includes the steps of:

for each glyph having a slope value from a subcategory which does not conform to an averaged slope value corresponding to said subcategory, setting said slope value to said averaged slope value; and for each glyph having a position value from a subcategory which does not conform to an averaged position value corresponding to said subcategory, setting said position value to said averaged position value.

13. A method for producing a string of characters, as recited in claim 9, wherein said desired appearance is a string of said characters which have a cursive handwritten appearance, wherein said ligatures include leading ligatures and trailing ligatures, and wherein said step of selecting includes the steps of:

assigning an initial glyph from said set of glyphs to represent a character portrayed at the beginning of a string of characters;

assigning a double null glyph from said set of glyphs to represent a character unconnected to other characters; and assigning other glyphs from said set of glyphs to represent characters connected to one or more other characters portrayed by said string of characters in such a manner that said leading ligatures and said trailing ligatures of adjacent glyphs connect to form a continuous line between a trailing ligature and an adjacent leading ligature, wherein said line has a continuous slope at the point of connection between said trailing ligature and adjacent leading ligature.

14. A method for producing a string of characters, as recited in claim 13, wherein said step of categorizing includes the step of calculating said appearance values for each of said ligatures of said glyphs and categorizing each of said glyphs within one of said ligature type categories according to said appearance values, said appearance values of said subcategories including a slope value and a position value, and wherein said averaging includes the steps of:

averaging said slope values within each of said subcategories to produce an averaged slope value for each subcategory;

averaging said position values within each of said subcategories to produce an averaged position value for each subcategory; and combining said averaged slope value and said averaged position value for each subcategory within a ligature type category to form said averaged appearance values for each ligature type category.

15. A method for producing a string of characters, as recited in claim 9, wherein said appearance values of said subcategories including a slope value and a position value, and wherein said set of predefined ligature types includes:

a null ligature type corresponding to a glyph having less than two ligatures;

a first ligature type corresponding to glyphs having ligatures which have an appearance value corresponding to a first predefined area with respect to said glyphs;

a second ligature type corresponding to glyphs having ligatures which have an appearance value corresponding to a second predefined area with respect to said glyph; and a third ligature type corresponding to glyphs having ligatures which have an appearance value corresponding to a third predefined area with respect to said glyph, said third predefined area being between said first predefined area and said second predefined area.

16. A method for producing a string of characters, as recited in claim 15, wherein said step of categorizing includes the step of calculating said appearance values for each of said ligatures of said glyphs and categorizing each of said glyphs within one of said ligature type categories according to said appearance values, said appearance values of said subcategories including a slope value and a position value, and wherein said averaging includes the steps of:

- averaging said slope values within each of said subcategories to produce an averaged slope value for each subcategory;
- averaging said position values within each of said subcategories to produce an averaged position value for each subcategory; and
- combining said averaged slope value and said averaged position value for each subcategory within a ligature type category to form said averaged appearance values for each ligature type category.

17. A computer implemented method for producing a font for creating strings of glyphs representing characters in a language having a handwritten appearance from a handwriting sample, comprising the steps of:

- processing said handwriting sample to develop a set of glyphs to be utilized to create said font;
- categorizing each glyph within said set of glyphs according to a set of predefined ligature types, each of said glyphs having either zero ligatures, one ligature, or two ligatures, each of said ligatures having an appearance value, such that each of said glyphs is categorized into at least two ligature type categories;
- averaging appearance values associated with ligatures of said glyphs categorized within each of said ligature type categories to produce representative appearance values for each of said ligature type categories;
- modifying at least one of said glyphs from said set of glyphs to produce a modified set of glyphs, a modified glyph having appearance values conformed to said representative appearance values from a ligature type category corresponding to said modified glyph; and
- assigning one or more glyphs from said modified set of glyphs to said stings of glyphs to represent characters as required by said font, whereby strings of glyphs produced from said modified set of glyphs have a handwritten appearance.

18. A method for producing a font, as recited in claim 17, wherein said writing sample is in a bit-mapped form, and wherein said step of processing said handwriting sample includes the steps of:

- defining individual characters within said writing sample, each of said individual characters having a leading ligature cut defined by a leading top point and a leading bottom point, each of said individual characters having a trailing ligature cut defined by a trailing top point and a trailing bottom point;
- assigning a Bezier corner point to said leading top point, said leading bottom point, said trailing top point, and said trailing bottom point; and
- converting said individual characters into glyphs represented by Bezier cubic splines having corner points and node points.

* * * * *